United States Patent [19]

Huang

[11] Patent Number: 5,397,161
[45] Date of Patent: Mar. 14, 1995

[54] STRUCTURE OF BICYCLE SADDLE

[76] Inventor: Wen-Chen Huang, No. 18, Alley 88, Lane 59, Nan Men Road, Taichung, Taiwan, Prov. of China

[21] Appl. No.: 210,136

[22] Filed: Mar. 17, 1994

[51] Int. Cl.⁶ .............................................. B60N 2/38
[52] U.S. Cl. ............................. 297/195.1; 297/337
[58] Field of Search ............... 297/195.1, 217, 337; 116/30, 307, 202

[56] References Cited

U.S. PATENT DOCUMENTS 2,359,254  9/1944  Silver ................................. 297/337
4,093,263  6/1978  Rihm ........................... 297/195.1 X Primary Examiner—Laurie K. Cranmer
Attorney, Agent, or Firm—Bucknam and Archer

[57] ABSTRACT

A bicycle saddle includes a protective outer covering, a rigid inside covering disposed inside the protective outer covering, a foamed lining disposed between the protective outer covering and the rigid inside covering, a flash light disposed at a rear side outside the saddle, a control switch disposed inside the saddle, and a DC power supply unit electrically connected to the flash light through the control switch, and wherein when the rider sits on the saddle the control switch is switched on by the pressure of the rider causing the flash light to give an audio flash signal.

1 Claim, 2 Drawing Sheets

STRUCTURE OF BICYCLE SADDLE

BACKGROUND OF THE INVENTION

The present invention relates to bicycle saddles, and more particularly relates to such a bicycle saddle which has flash signal generating means.

Riding a bicycle in the dark is dangerous. In order to give a warning signal to the vehicles from behind, a bicycle may be equipped with a rear light or reflector means. However, reflector means do not work well in some conditions. When a rear light is installed, it must be switched on manually before riding in the dark. Furthermore, this type of bicycle rear light consumes much power and is not durable in use.

SUMMARY OF THE INVENTION

The present invention has been accomplished under the aforesaid circumstances. It is therefore an object of the present invention to provide a bicycle saddle which automatically gives an audio flash signal when the rider sits thereon. It is another object of the present invention to provide a bicycle saddle which automatically gives a flash signal in the dark.

According to one aspect of the present invention, the bicycle saddle comprises a protective outer covering, a rigid inside covering disposed inside the protective outer covering, a foamed lining disposed between the protective outer covering and the rigid inside covering, a flash light disposed at a rear side outside the saddle, a push-button type control switch disposed inside the saddle, and a DC power supply unit electrically connected to the flash light through the push-button type control switch, and wherein when the rider sits on the saddle the push-button type control switch is switched on by the pressure of the rider causing the flash light to give a flash signal. According to still another aspect of the present invention, a manual switch is provided to control the operation of the push-button type control switch manually. According to still another aspect of the present invention, a bearing plate is provided having a bottom rod perpendicularly fastened to the push-button type control switch to increase the bearing surface of the push-button type control switch, and therefore the push-button type control switch can be easily switched on by the pressure of the rider.

DETAILED DESCRIPTION OF THE PREFERRED EMBODIMENT

Figure 1:
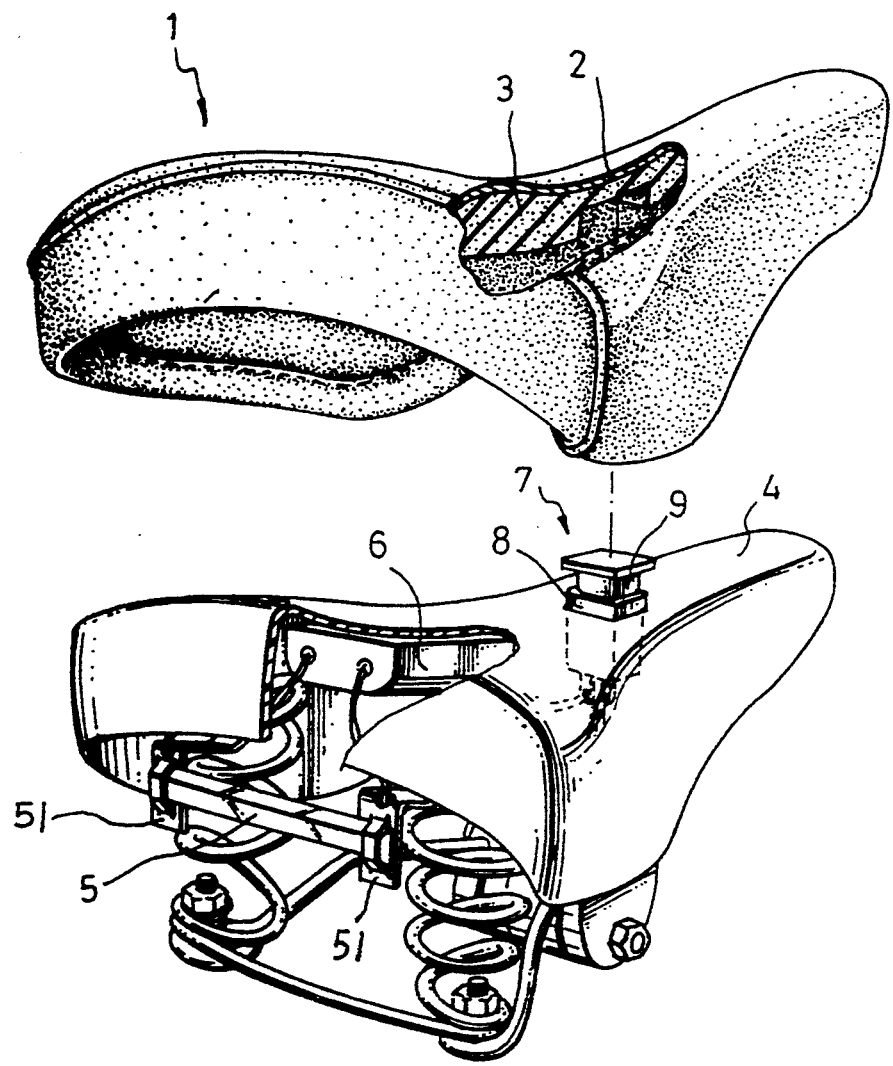
FIG. 1 is a cutaway and partially exploded view of a bicycle saddle according to the present invention.
Figure 2:
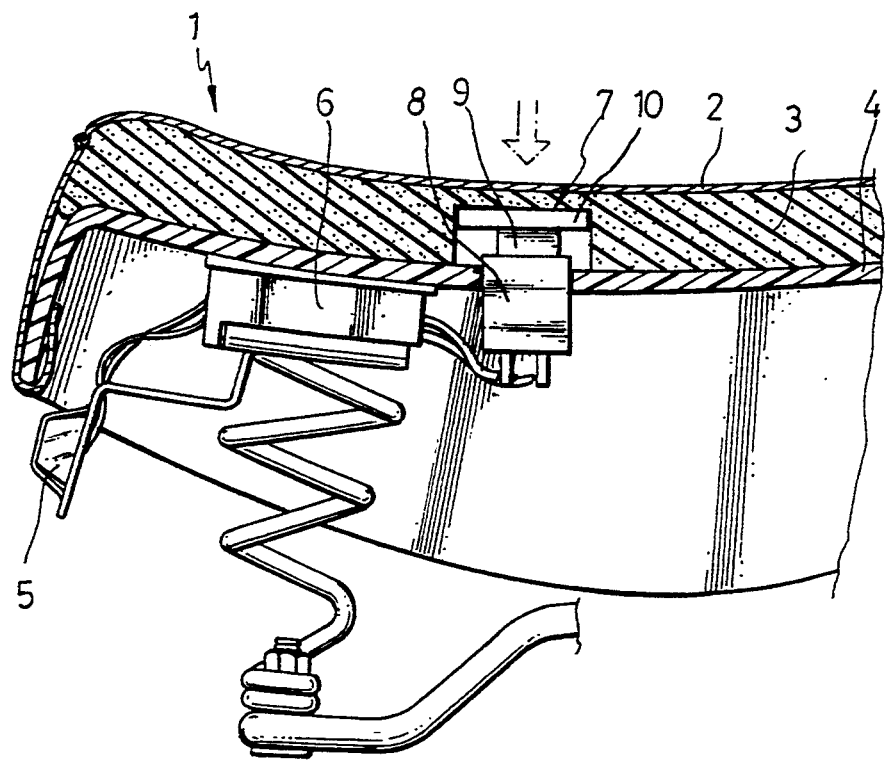
FIG. 2 is a sectional view of the bicycle saddle shown in FIG. 1, showing the positioning of the control switch.

Referring to FIGS. 1 and 2, a bicycle saddle, referenced by 1, comprises a protective outer covering 2, a rigid inner covering 4 disposed inside the protective outer covering 2, a foamed lining 3 fastened to the protective outer covering 2 on the interior and disposed between the protective outer covering 2 and the rigid inner covering 4, a flash light 5 attached to plate 51 disposed on the rear side, a battery box 6 disposed within the rigid inner covering 4, and a control switch 7 disposed inside the bicycle saddle 1. When the rider sits on the saddle 1, the control switch 7 is switched on by the body weight of the rider causing the flash light 5 to flash.

Referring to FIG. 2, the control switch 7 is comprised of a switch body 8 mounted within a hole (not shown) on the rigid inner covering 4, a push-button type switching lever 9 received within the switch body 8 and disposed inside the foamed lining 3, wherein the push-button type switch lever 9 has a flat head 10 horizontally disposed at the top. The flat head 10 increases the bearing surface of the switching lever 9 so that the switching lever 9 can be easily switched on by the body weight of the rider as the rider sits on the saddle 1. The control switch 7 is switched on as the flat head 10 bears the pressure; the switching lever 9 automatically trips off when the pressure is released.

Figure 3:
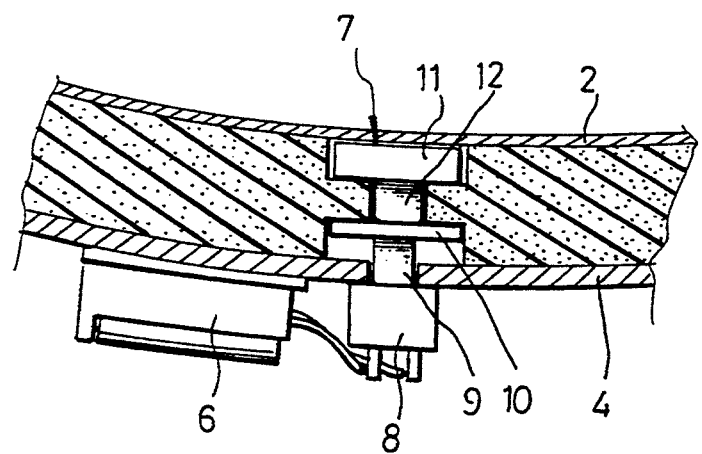
FIG. 3 is a sectional view of an alternate form of the control switch.

Referring to FIG. 3, as an alternate form of the present invention, a flat bearing plate 11 is disposed inside the foamed lining 3 and closely against to the inside wall of the protective outer covering 2 and having a bottom rod 12 perpendicularly fastened to the center of the flat head 10 of the switching lever 9 at the top. Because the bearing plate 11 is directly attached to the inner wall of the protective outer covering 2, the pressure of the rider is accurately transmitted to the switching lever 9 through the bearing plate 11 causing the control switch 7 switched on.

As indicated, the present invention provides a bicycle saddle which gives a flash signal automatically, when the rider rides the bicycle, to warn the vehicles coming from behind.

While only two alternate forms of the present invention have been shown and described, it will be understood that various modifications and changes could be made without departing from the spirit and scope of the invention.

What is claimed is:

1. A bicycle saddle having a front, an interior and a rear side, comprising:
   a protective outer covering, having an inner wall and having an interior;
   a rigid inner covering disposed in the interior of said protective outer covering;
   a foamed lining fastened to said protective outer covering said inner wall and disposed between said protective outer covering and said rigid inner covering, said foamed lining having an interior;
   a pair of plates;
   a flash light attached to said pair of plates at said rear side of the saddle;
   a control switch disposed in said interior of the saddle, said control switch is comprised of a switch body, a push-button type switching lever, said push-button type switching lever having a flat head, said flat head having a top surface, a flat bearing plate disposed in the interior of said foamed lining and against said inner wall of said protective outer covering, said flat bearing plate having a bottom rod perpendicularly attached to said top surface of said flat head; and
   a DC power supply unit electrically connected to said flash light through said control switch; wherein when a rider sits on the saddle said control switch is switched on by the pressure of the rider causing said flash light to give a flash signal.

* * * * *